US010901863B2

(12) United States Patent
Lukkoor et al.

(10) Patent No.: US 10,901,863 B2
(45) Date of Patent: *Jan. 26, 2021

(54) UNIFIED DATA LAYER BACKUP SYSTEM

(71) Applicant: International Business Machines Corporation, Armonk, NY (US)

(72) Inventors: Anjan G. Lukkoor, Saratoga, CA (US); James D. Spyker, Toronto (CA)

(73) Assignee: International Business Machines Corporation, Armonk, NY (US)

( * ) Notice: Subject to any disclaimer, the term of this patent is extended or adjusted under 35 U.S.C. 154(b) by 259 days.

This patent is subject to a terminal disclaimer.

(21) Appl. No.: 16/192,177

(22) Filed: Nov. 15, 2018

(65) Prior Publication Data
US 2019/0087289 A1  Mar. 21, 2019

Related U.S. Application Data

(63) Continuation of application No. 15/346,825, filed on Nov. 9, 2016, now Pat. No. 10,216,586.

(51) Int. Cl.
*G06F 11/20* (2006.01)
*G06F 11/14* (2006.01)

(52) U.S. Cl.
CPC ........ *G06F 11/203* (2013.01); *G06F 11/1451* (2013.01); *G06F 11/1469* (2013.01);
(Continued)

(58) Field of Classification Search
CPC ............. G06F 11/1402; G06F 11/1446; G06F 11/2028; G06F 11/2023; G06F 11/1469;
(Continued)

(56) References Cited

U.S. PATENT DOCUMENTS

| 7,024,581 | B1* | 4/2006 | Wang | G06F 11/1417 |
| | | | | 713/2 |
| 7,383,463 | B2* | 6/2008 | Hayden | G06F 11/2069 |
| | | | | 714/4.11 |

(Continued)

OTHER PUBLICATIONS

List of IBM Patents or Patent Applications Treated as Related, Nov. 14, 2018, 2 pgs.

(Continued)

*Primary Examiner* — Dung K Chau
(74) *Attorney, Agent, or Firm* — Jared L. Montanaro

(57) ABSTRACT

A primary system is established at a first site. The primary system hosts an application and a primary database for remote users that use the application to manage data of the primary database. A unified data layer is established at a remote site. The unified data layer provides access to data of the primary database without providing access to the primary database. A triggering event that impairs the ability of the primary system to host the application is detected. A recovery system is instantiated in response to detecting the triggering event. The recovery system includes both a recovery instance of the application and a recovery database for the data of the application. The recovery database is populated using the unified data layer. The recovery system is activated such that remote users can access the recovery instance of the application to manage data of the recovery database.

20 Claims, 5 Drawing Sheets

(52) U.S. Cl.
CPC ...... *G06F 11/2038* (2013.01); *G06F 11/2048* (2013.01); *G06F 11/2097* (2013.01); *G06F 2201/80* (2013.01)

(58) Field of Classification Search
CPC ............. G06F 11/1451; G06F 11/1458; G06F 11/1471
USPC .................................. 707/682, 678, 999.202
See application file for complete search history.

(56) References Cited

U.S. PATENT DOCUMENTS

| | | | |
|---|---|---|---|
| 9,110,745 B2 | 8/2015 | Kang et al. | |
| 9,208,032 B1* | 12/2015 | McAlister | ........... H04L 41/0668 |
| 2004/0230859 A1 | 11/2004 | Cochran et al. | |
| 2006/0288183 A1* | 12/2006 | Boaz | ................... G06F 11/1451 |
| | | | 711/164 |
| 2008/0178185 A1* | 7/2008 | Okada | .................... H04L 69/40 |
| | | | 718/103 |
| 2009/0172461 A1* | 7/2009 | Bobak | ................ G06F 11/0793 |
| | | | 714/2 |
| 2014/0200929 A1* | 7/2014 | Fitzgerald | .......... G06Q 10/0635 |
| | | | 705/4 |
| 2015/0019491 A1 | 1/2015 | Hunt et al. | |
| 2015/0149098 A1* | 5/2015 | Daugela | .................. B04B 13/00 |
| | | | 702/45 |
| 2015/0254150 A1 | 9/2015 | Gordon et al. | |
| 2015/0317220 A1* | 11/2015 | Sampath | ............. G06F 11/3072 |
| | | | 714/4.11 |
| 2016/0314046 A1 | 10/2016 | Kumarasamy | |
| 2016/0357644 A1 | 12/2016 | Gordon et al. | |
| 2018/0129571 A1 | 5/2018 | Lukkoor et al. | |

OTHER PUBLICATIONS

Kleppmann, M. "Bottled Water: Real-time integration of PostgreSQL and Kafka," http://www.confluent.io/blog/bottled-water-real-time-integration-of-postgresql-and-kafka/, Apr. 23, 2015, printed Jul. 5, 2016, 16 pgs.

Mell et al., "The NIST Definition of Cloud Computing," Recommendations of the National Institute of Standards and Technology, U.S. Department of Commerce, Special Publication 800-145, Sep. 2011, 7 pgs.

Accelerated Examination Support Document, U.S. Appl. No. 15/658,613, dated Jul. 24, 2017, 17 pgs.

* cited by examiner

UNIFIED DATA LAYER BACKUP SYSTEM

The present disclosure relates to disaster recovery, and more specifically, to the field of disaster recovery for hosted applications.

As hosted solutions (e.g., software as a service, platforms as a service, infrastructure as a service, etc.) become more common, customers are becoming increasingly expectant that any interruptions in service are infrequent and/or brief. However, computer systems can be impaired by any number of harmful events, such as malicious software, faulty hardware, or so-called natural disasters. As such, providers of hosted solutions are expected to plan for disasters and have disaster recovery solutions to fix and/or eliminate any interruptions that harmful events may cause.

SUMMARY

According to embodiments of the present disclosure, an apparatus, computer program product, and method for using a unified data layer to provide a backup for a computer system are provided. A primary system is established at a first site. The primary system includes both a primary instance of an application being hosted by the primary system and a primary database for data of the application. The application is hosted for remote users that use the application to manage data of the primary database. A unified data layer for the primary system is established at a second site. The unified data layer provides access to data of the primary database without providing access to the primary database. The second site is relatively remote from the first site. A triggering event of the primary system is detected. The triggering event impairs the ability of the primary system to host the application. A recovery system is instantiated in response to detecting the triggering event. The recovery system includes both a recovery instance of the application and a recovery database for the data of the application. The recovery system is not located at the first site. The recovery database is populated using the unified data layer. The recovery system is activated. Activating the recovery system includes allowing the remote users to access the recovery instance of the application to manage data of the recovery database.

The above summary is not intended to describe each illustrated embodiment or every implementation of the present disclosure.

BRIEF DESCRIPTION OF THE SEVERAL VIEWS OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
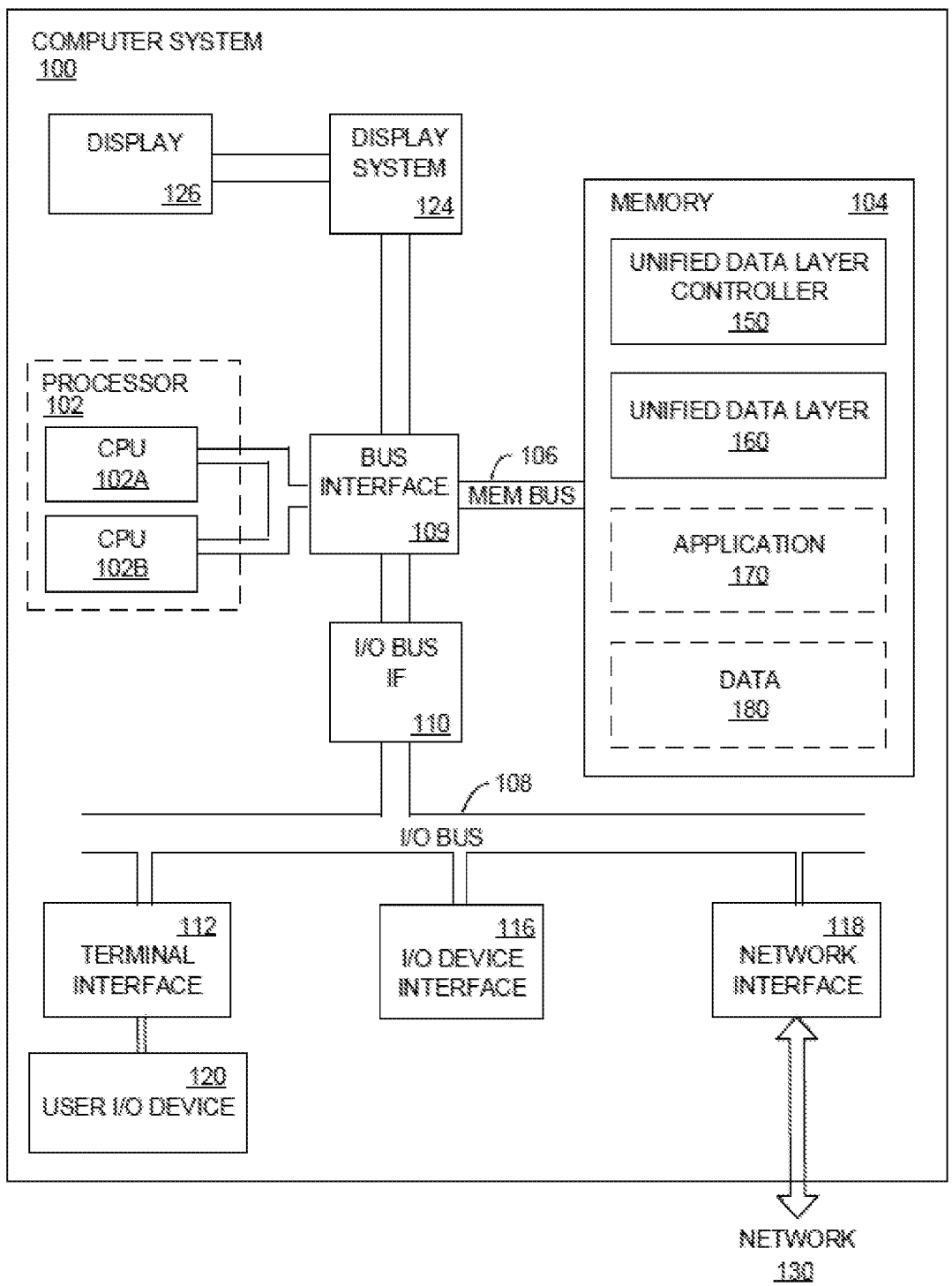
FIG. 1 depicts an example of a computer system that utilizes a unified data layer backup system, according to embodiments of the present disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to using a unified data layer for disaster recovery. Unified data layers can provide the data of a database for easy analysis while also maintaining secure access to the database. The database can be reproduced using the unified data layer. Storing the unified data layer at a remote site may allow the unified data layer to be used as a low-maintenance disaster recovery system. While the present disclosure is not necessarily limited to such applications, various aspects of the disclosure may be appreciated through a discussion of various examples using this context.

A modern business model includes providing an internet application that delivers a service to a user, where one or more databases store some data that the user produces/analyzes/manages using the application. Modern users expect that the application will be consistently available and their user data will be consistently recallable. As such, conventional business models typically have a disaster recovery (DR) solution to provide the application and user data in the event of a disaster that impairs the ability of the original application host and/or database servers to provide the application and user data. High-end conventional DR solutions (e.g., solutions that allow for recovery within a matter of minutes or seconds) often include a second set of database servers that constantly receives all new write activity for the initial database server. Additionally, conventional DR solutions often include purposefully underutilized computer architecture with environments that constantly mirror the "live" application and database, and can be brought online to host the application in lieu of the impaired systems.

Conventional high-end DR solutions also typically include the spare architecture being remotely located (e.g., 15 or more miles away from a primary site). Conventional DR solutions sometimes use these DR sites for offloading analytics, but the complexity of maintaining such an environment (along with the difficulty of identifying an analytics workload that can be effectively run against the same database management system (DBMS) that is used to host the application) means that many clients cannot effectively leverage this hardware. As a result, such hardware will remain idle unless/until a disaster occurs, dramatically increasing the cost of providing a product that will be backed up in such a manner.

For entities with a long recovery time objective (RTO), such a conventional high-end DR solution may be cost prohibitive. Instead, an entity with a long RTO (e.g., 12 hours) may utilize conventional DR as a service (DRaaS) options that are able to make a database operational within hours rather than seconds or minutes. However, "state-of-the-art," conventional DRaaS solutions may do nothing more than occasionally gather images of virtual machines and/or create a recovery point objective (RPO) of a basepoint of data. Such conventional DRaaS have a high probability of losing data, as any data that has been entered/changed within a database since the most recent image/RPO will not be recovered as part of the DRaaS solution.

Aspects of the disclosure relate to using a unified data layer of an open-source message broker system to manage disaster recovery. The unified data layer supports an application and database running off a host and server, respectively. The unified data layer is hosted by a different computer system than the computer system(s) that host the application and database. In some embodiments, the unified data layer is geographically located at a site that may be physically remote (e.g., 15 or more miles away) from the primary site that hosts the application and database. As the data of the database is changed, the unified data layer is updated. In the event of a disaster that impairs the ability of the primary site to run the application and/or server, a new instance of the application and/or a new database is brought online. In some embodiments, the application instance and/or database is hosted on the cloud using platform as a service (PaaS) or infrastructure as a service (IaaS). The unified data layer may continue to be updated as the hosted DR application and/or database operates. At some point the primary site may be brought back online. As this happens, the unified data layer may be used to update the initial database as needed. Once the primary site is completely operational, the DR application and/or database may be brought offline.

FIG. 1 depicts a high-level block diagram of a computer system 100 for managing DR using a unified data layer. The components of the various embodiments disclosed herein apply equally to any appropriate computing system. The components of the example computer system 100 shown in FIG. 1 include a memory 104, a terminal interface 112, an I/O (Input/Output) device interface 116, and a network interface 118, all of which are communicatively coupled, directly or indirectly, for inter-component communication via a memory bus 106, an I/O bus 108, a bus interface unit 109, and an I/O bus interface unit 110.

The computer system 100 includes one or more general-purpose programmable central processing units (CPUs) 102A and 102B, herein generically referred to as the processor or processors 102. In some embodiments, the computer system 100 may contain multiple processors. In other embodiments, the computer system 100 may alternatively be a single CPU system. Each processor 102 executes instructions—such as the instructions from the unified data layer controller 150 to perform the acts described with respect to method 300—stored in the memory 104.

In some embodiments, the memory 104 may include a random-access semiconductor memory, storage device, or storage medium (either volatile or non-volatile) for storing or encoding data and programs. The memory 104 can store data 180 gathered and analyzed as described herein. The data 180 may include data gathered during clock optimization of circuits of the processor 102. In some embodiments, the data 180 may be stored in one or more computer systems 100 connected over the network 130. In certain embodiments, the memory 104 represents the entire virtual memory of the computer system 100, and may also include the virtual memory of other systems coupled to the computer system 100 or connected via a network 130.

The memory 104 may store all or a portion of the various programs, modules and data structures for managing DR using a unified data layer as discussed herein. For instance, the memory 104 can include an application 170 that is hosted for a customer. The application 170 may be available in a containerized (e.g., docker) form, or alternatively as a prebuilt deployable component from a system (e.g., Urban Code Deploy). The customer may access the application 170 over the network 130. While using the application 170, the customer may manage, produce, and/or analyze data 180. The memory 104 may store this data 180. In some embodiments, the computer system 100 may host the application 170 for customers while data 180 of the application 170 is stored on a server (e.g., a device that is analogous to the computer system 100) that is connected to the computer system 100 over the network 130.

The memory 104 may include the unified data layer controller 150. The unified data layer controller 150 allows a user to see and download forms of data 180 without allowing the user direct access to the actual data 180 and/or the computer system 100. The unified data layer controller 150 can maintain a unified data layer 160, which is a low latency copy of the data 180. The unified data layer 160 is maintained using a variety of techniques known in the art such as log-based change capture of the data 180 or change stream application programming interfaces (APIs) available from database as a service (DBaaS) environments. The low-latency copy of the data 180 that can be gathered from the unified data layer 160 may be generally equivalent to the data 180, and may therein be generally equivalent to a conventional DR copy of the data 180.

The memory 104 of the computer system 100 may host the unified data layer controller 150 while the application 170 and data 180 are stored on one or more separate devices (e.g., devices that are analogous to the computer system 100) that are connected to the computer system 100 over the network 130. The unified data layer controller 150 may detect a disaster that makes the application 170 and/or the data 180 unavailable. As a result, a recovery instance of the application 170 and/or data 180 may be brought online. The recovery instance of the application 170 and/or data 180 may be hosted by one or more separate computer systems (e.g., devices that are analogous to the computer system 100). The unified data layer controller 150 may connect to these recovery instances of the application 170 and/or data 180 through the network 130. The unified data layer controller 150 may maintain a run book within the unified data layer 160. This run book may facilitate the provisioning and deployment of the recovery instance of the application 170. The unified data layer controller 150 may be used to populate the recovery instance of the data 180.

In the depicted embodiment, the computer system 100 includes a bus interface unit 109 to handle communications among the processor 102, the memory 104, a display system 124, and the I/O bus interface unit 110. The I/O bus interface unit 110 may be coupled with the I/O bus 108 for transferring data to and from the various I/O units. The I/O bus interface unit 110 communicates with multiple I/O interface units 112, 116, and 118, which are also known as I/O processors (IOPs) or I/O adapters (IOAs), through the I/O bus 108. The display system 124 may include a display controller, a display memory, or both. The display controller may provide video, audio, or both types of data to a display device 126, such as a standalone display screen, computer monitor, television, or a tablet or handheld device display. The display system 124 may include a dedicated memory for buffering video data.

In at least one embodiment, the display device 126 may include one or more speakers for rendering audio. Alternatively, one or more speakers for rendering audio may be coupled with an I/O interface unit. In alternate embodiments, one or more of the functions provided by the display system 124 may be on board an integrated circuit that also includes the processor 102. In addition, one or more of the functions provided by the bus interface unit 109 may be on board an integrated circuit that also includes the processor 102.

The I/O interface units support communication with a variety of storage and I/O devices. For example, the terminal interface unit 112 supports the attachment of one or more user I/O devices 120, which may include user output devices (such as a video display device, speaker, and/or television set) and user input devices (such as a keyboard, mouse, keypad, touchpad, trackball, buttons, light pen, or other pointing device).

The I/O device interface 116 provides an interface to any of various other I/O devices or devices of other types, such as printers or fax machines. The network interface 118 provides one or more communication paths from the computer system 100 to other digital devices and computer systems.

Although the computer system 100 shown in FIG. 1 illustrates a particular bus structure providing a direct communication path among the processors 102, the memory 104, the bus interface 109, the display system 124, and the I/O bus interface unit 110, in alternative embodiments the computer system 100 may include different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface unit 110 and the I/O bus 108 are shown as single respective units, the computer system 100 may, in fact, contain multiple I/O bus interface units 110 and/or multiple I/O buses 108. While multiple I/O interface units are shown, which separate the I/O bus 108 from various communications paths running to the various I/O devices, in other embodiments, some or all of the I/O devices are connected directly to one or more system I/O buses.

FIG. 1 depicts several example components of the computer system 100. Individual components, however, may have greater complexity than represented in FIG. 1, components other than or in addition to those shown in FIG. 1 may be present, and the number, type, and configuration of such components may vary. Several particular examples of additional complexity or additional variations are disclosed herein; these are by way of example only and are not necessarily the only such variations. The various program components illustrated in FIG. 1 may be implemented, in various embodiments, in a number of different manners, including using various computer applications, routines, components, programs, objects, modules, data structures, etc., which may be referred to herein as "software," "computer programs," or simply "programs."

Figure 2:
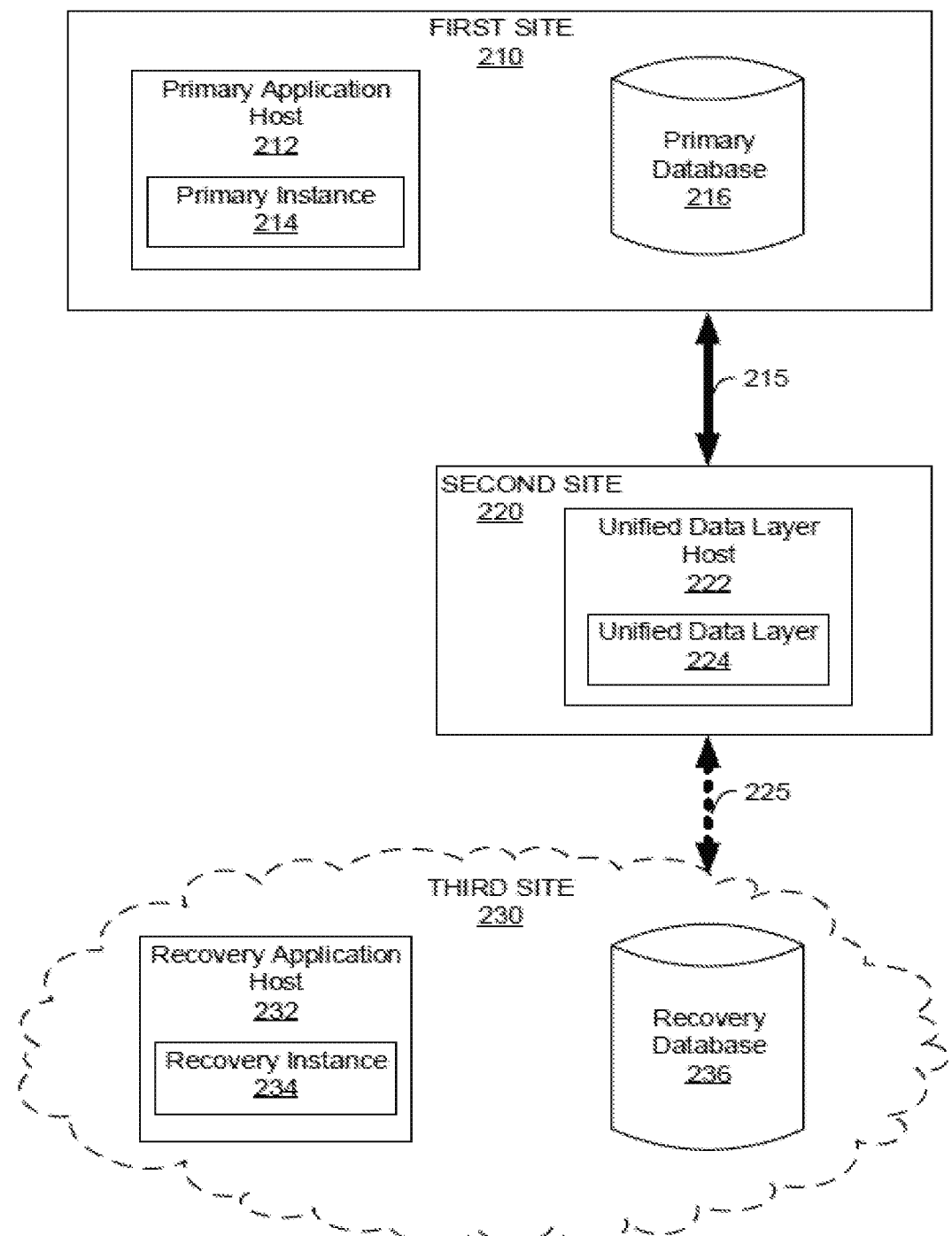
FIG. 2 depicts an example of system architectures used for hosting a service and providing disaster recovery for the service across numerous sites, according to embodiments of the present disclosure.

FIG. 2 depicts system architectures used for hosting a service and providing disaster recovering for the service across numerous sites. The service may be the use of an application and/or data of an application. The application may be hosted as a primary instance 214 by a primary application host 212 at a first site 210. The primary application host 212 may be equivalent to the computer system 100 of FIG. 1, and the application may be equivalent to the application 170 of the computer system 100 of FIG. 1.

The data of the application may be saved at a primary database 216. The primary database 216 may be equivalent to the computer system 100 of FIG. 1. The primary database 216 is located at the first site 210. The first site 210 may be a building, room, or the campus of an institution (e.g., the campus of a business). The first site 210 is a location, which may be small enough such that a notable natural disaster (e.g., a fire, earthquake, tornado, etc.) may impair the abilities of numerous computer systems on site. For example, the first site 210 may include two buildings across two acres, and a natural disaster that occurs on the first site 210 may impair the ability of both the primary application host 212 and/or the primary database 216 to function as designed/expected/required.

The application data may be managed, in part, using a unified data layer 224. The unified data layer 224 may provide users the ability to read data of the primary database 216 without providing access to the primary database 216 (e.g., the end user may not be able to perform writes to the primary database, only some of the data is visible, etc.). The unified data layer 224 may be a component of an open-source message broker system (e.g., Apache Kafka, etc.). The unified data layer 224 may specifically allow for convenient analysis of the data of the primary database 216. The unified data layer 224 may utilize change data capture (CDC) techniques. For example, the unified data layer 224 may include an image of the entirety of the primary database 216 at a single point in time. Additionally, the unified data layer 224 may include a stream of all changes to the data of the primary database 216 from that single point in time onwards. CDC techniques may allow for a quick analysis of how the data of the primary database 216 has changed over time.

The unified data layer 224 may be hosted by a unified data layer host 222. The unified data host 222 may be located at a second site 220. The second site 220 may be relatively remote from the first site 210, such that a natural disaster that impairs computer systems (e.g., the primary application host 212 or the primary database 216) at the first site 210 may not impair computer systems (e.g., unified data layer host 222) at the second site. For example, the second site 220 may be located at least 15 miles away from the first site 210.

In some embodiments, the first site 210 may host a copy of the unified data layer 224. The copy of the unified data layer 224 may be substantially similar to the unified data layer 224 of the second site 220. The copy of the unified data layer 224 may be used by the application instance 214 on the primary application host 212 for performance reasons. The copy of the unified data layer 224 that is kept on the first site 210 may be created/maintained using the same techniques (e.g., CDC techniques) as the unified data layer 224 at the second site 220.

In certain embodiments, the unified data layer 224 may be partially stored at the first site 210. However, in these embodiments, certain specific portions of the unified data layer 224 may still be hosted on the unified data layer host 222 on the second site 220. Specifically, the first site 210 may include all portions of the unified data layer 224 that are not necessary to rebuild the primary database 216 in the event of a disaster that impacts the systems of the first site 210 or the connection 215 to the first site.

At the primary instance of the application 214, the unified data layer 224 is updated with the changed data of the primary database 216 through a first connection 215 from the first site 210 to the second site 220. A unified data layer controller, such as the unified data layer controller 150 of FIG. 1, may update the unified data layer 224. The unified data layer 224 may be updated by adding a new entry in the stream of changes to the primary database 216. In some embodiments, if a single portion of data (e.g., bit, file, folder, etc.) of the primary database 216 is changed numerous times, the most recent change will overwrite the previous changes, such that only the most recent change to each portion of data is maintained.

The first site 210 may experience a disaster. The disaster may be any kind of disaster as discussed herein that impairs the ability of the primary application host 212 and/or primary database 216 to host the application and data for the application. The disaster may alternatively include a loss of the first connection 215 between the first site 210 and the second site 220. As a result of the disaster, another instance of the application and/or database may be brought online. In some embodiments, both the primary instance 214 and the primary database 216 are impaired by the disaster, so as part of the DR effort a recovery instance 234 of both the application and a recovery database 236 are brought online. The recovery instance 234 of the application and the recovery database 236 may exist at a third site 230. The third site 230 may operate with a second connection 225 to the second site.

The recovery database 236 may be populated using the unified data layer 224. For example, if the unified data layer 236 utilizes CDC techniques, the recovery database 236 could receive the image of the primary database 216 and then process all data updates of the unified data layer 236 stream. Some portion of the unified data layer 224 may be stored on the third site 230, similar to how some portions of the unified data layer can be stored on the first site 210.

The recovery instance 234 of the application may be provisioned from a cloud computing environment provided by a cloud provider. In some embodiments, the underlying platform can be obtained by PaaS or IaaS providers (e.g., SoftLayer). The application itself may be available in a containerized (e.g., docker) form or as a prebuilt deployable component (e.g., a component from a system such as Urban Code Deploy). The cloud may function as a third site 230. The recovery instance 234 may be virtually hosted on a recovery application host 232, which may be a virtual machine (VM).

As the recovery instance 234 processes data of the recovery database 236, data updates may be recorded by the unified data layer 224. In some embodiments, the unified data layer 224 takes a recovery image at the moment of disaster, such that the log of the unified data layer 224 is a record of the updates from the moment of disaster moving forward. In other embodiments, the data of the primary database 216 may be unavailable to the unified data layer 224 after the disaster, such that a post-disaster image is impossible. In embodiments where the data of the primary database 216 is unavailable after the recovery, an image may be gathered of the recovery database 236 once the recovery database 236 is fully populated but before the recovery application 234 executes any writes to the recovery database 236.

The first site 210 may recover from the disaster such that the primary application host 212 and the primary database 216 have the ability to host the application and store the data of the application, respectively. A controller of the unified data layer 224 may detect the return of the capabilities of the first site 210. In response to detecting that the first site 210 has come back online, the primary database 216 may use the unified data layer 224 to acquire the latest data of the recovery database 236. While the first site 210 is being "resynchronized" the recovery instance 234 of the application may continue running, therein changing data of the recovery database 236 as needed. These additional changes made during resynchronization are added to the stream of changes of the unified data layer 224.

In embodiments where the original data of the primary database 216 was lost, the primary database 216 may use both the original image and the stream of updates to bring the primary database 216 up to speed. Alternatively, in embodiments where the primary database 216 still has the data from before the disaster, the primary database 216 may only need the stream of updates made by the recovery instance 234 and recorded by the unified data layer 224 to bring the primary database 216 up-to date.

Once the primary database 216 has all of the data of the recovery database 236 and the primary instance 214 is available, site three 230 may be decommissioned and a cutover executed. The cutover may include the recovery database 236 and the recovery instance 234 going offline and the primary instance 214 and primary database 216 going back online. The cutover may include a small outage before the application services are again available to online customers through the primary instance 214.

Once the primary instance 214 of the application is running as normal again, the source database 216 may execute a full re-initialization with the unified data layer 224. This may ensure that any data changes that were lost at the time of the disaster (e.g., changes made in the primary database 216 immediately before the disaster that were not able to be written to the unified data layer 224 due to the disaster) are reflected into the unified data layer 224. Upon this re-initialization, the primary instance 214, primary database 216, and unified data layer 224 may function as they did originally, where the primary instance 214 creates/manages/analyzes data of the primary database 216, and the unified data layer 224 records any updates to the data of the primary database 216.

Figure 3:
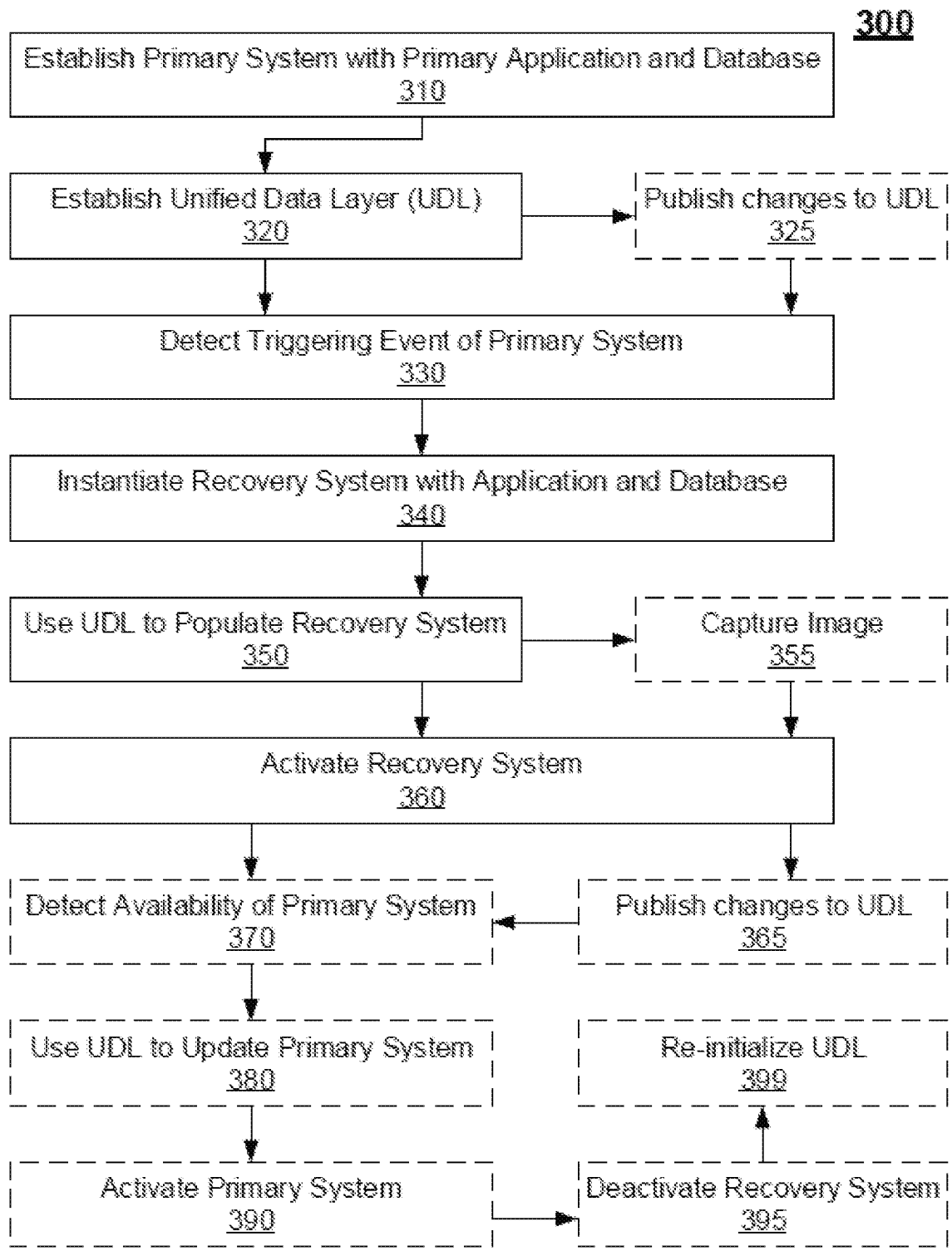
FIG. 3 depicts an example of a method diagram of managing disaster recovery with a unified data layer, according to embodiments of the present disclosure.

FIG. 3 is a flowchart illustrating an example method 300 for managing disaster recovery using a unified data layer, according to embodiments of the present disclosure. The unified data layer may be similar to the unified data layer 224 of FIG. 2. The disaster may impair the abilities of a computer such as the computer system 100 of FIG. 1. Method 300 may be implemented in whole or in part by a controller, such as the unified data layer controller 150 of FIG. 1. Blocks with hashed lines in FIG. 3 are optional steps within method 300. The visual arrangement of blocks in the flowchart of FIG. 3 is not to be construed as limiting the order in which the individual acts/operations may be performed, as certain embodiments may perform all or some of the operations of FIG. 3 in alternative orders.

At block 310 a primary system (e.g., primary computer system) is established with a primary application and a primary database. The primary system may be at a first site, as described herein. The primary database stores data for the primary application. The primary application may be hosted by the same computer system that stores the source database, or the primary application may be hosted by a separate computer system. For example, the primary application may be hosted by a first server, and the primary database may be stored on a second server.

The primary system may provide services relating to using the primary application to customers. The primary application may be available as software as a service (SaaS). The primary application may be used by customers to create/manage/analyze data, such as data of the primary database.

At block 320 a unified data layer is established. The unified data layer may allow third parties to view/access the data of the primary database without allowing third parties access to the primary database. The unified data layer may include an image of the primary database at a single point in time and a stream of changes (e.g., overwrites, addition of new data, etc.) to all data in the primary database. The unified data layer may use CDC techniques as described herein and known to one skilled in the art. At block 325 changes to the primary database may be published to the unified data layer. The unified data layer may record these changes as updates/new entries within the stream of changes.

At block 330 a triggering event is detected. The triggering event may be detected by a unified data layer controller. The triggering event may be a disaster as described herein. The disaster may impair the ability of the source application and/or database to function. As a result of this impairment, the primary system may no longer have the ability to host the application as a SaaS in an optimal fashion. In some embodiments, after the triggering event the primary system may not be able to provide the application as a SaaS at all. In some embodiments only a disaster that impairs the ability of both the source application and database will be classified as a triggering event as used within method 300. In other embodiments, any disaster that impairs the ability of either the primary database or the source application will be classified as a triggering event.

At block 340, a recovery system (e.g., recovery computer system) is instantiated. The recovery system is instantiated in response to the triggering event. Instantiating the recovery system may include provisioning off a portion of new environments/virtual machines on a cloud computing environment that are adequate to process the recovery system. The recovery system may include both a recovery application instance and a recovery database. In some embodiments, as described above, the recovery instance only hosts a recovery instance of the system that was impaired in the disaster.

At block 350 the unified data layer is used to populate the recovery system. The unified data layer may populate the recovery database of the recovery system. The recovery database may be populated by starting with an image of the primary database that is available on the unified data layer and then processing the stream of changes to the data that is available on the unified data layer.

In some embodiments, as soon as the unified data layer populates the recovery system, an image is taken of the populated recovery system at block 355. The unified data layer may take the image of the populated recovery system. The image may include a complete set of all data points stored within the populated recovery system. The image may be stored consistent with CDC techniques as described herein.

At block 360 the recovery system is activated. Activating the recovery system includes hosting the application using the recovery system. Activating the recovery system may include bringing online both a recovery instance of the application and a recovery instance of the database. The application may be hosted by the recovery system with the exact same capabilities as when the application was hosted by the primary system. As the recovery application makes changes to data of the recovery database, changes may get published to the unified data layer as at block 365.

At block 370 the availability of the primary system may be detected. Detecting the availability of the primary system may include detecting that the primary system has the ability to host the primary application instance and the primary database. In response to detecting that the primary system is available, at block 380 the unified data layer may be used to update the primary system. While the primary system is being updated, the recovery system may still be hosting the application. While hosting the application during this update, the recovery instance of the application may make changes to the data of the recovery database. Any changes to the recovery database that take place while the primary system is being updated will be added to the unified data layer, such that said changes will eventually be reflected in the primary system once the primary system is updated to include all entries in the log of the unified data layer.

The unified data layer may use the image taken at block 355 to update the primary database. Specifically, the unified data layer may only use the stream of changes that have been logged since the image to update the primary system. Using the image to update the primary system may have performance benefits. In other instances an image may not be available. In such instances, the entirety of the unified data layer may be used to update the primary system (e.g., the entire topic of each entry of the unified data layer may be read and applied for each table of the unified data layer and primary database).

At block 390, the primary system may be brought online. Bringing the primary system online may include providing the application as a SaaS again. When the primary system is brought online the recovery system may be brought offline. A cutover with an outage may occur during this transition. After the recovery system is brought offline, the recovery system may be deactivated at block 395, which may include deleting all partitions/environments/virtual machines that were created at block 340. At block 399 the unified data layer may be re-initialized as described herein to ensure that the unified data layer reflects any changes to the primary database that occurred immediately before the triggering event that did not get transmitted to the unified data layer.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

The functionality outlined in the discussions herein regarding FIG. 1, FIG. 2, and FIG. 3 above can be implemented using program instructions executed by a processing unit, as described in more detail below.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to also be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
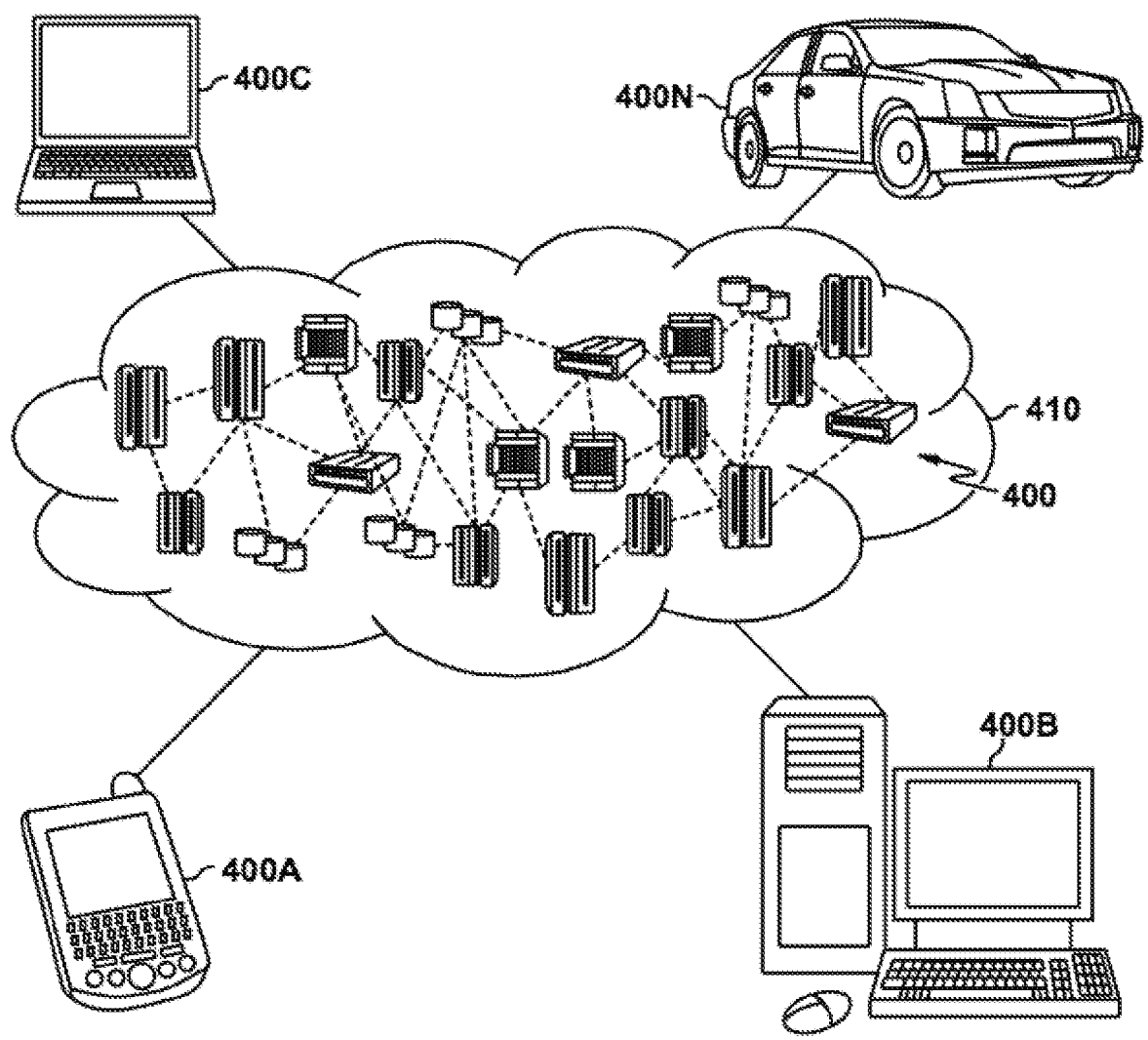
FIG. 4 depicts a cloud computing environment according to an embodiment of the present invention.

Referring now to FIG. 4, illustrative cloud computing environment 410 is depicted. As shown, cloud computing environment 410 includes one or more cloud computing nodes 400 with which local computing devices used by cloud consumers, such as, for example, personal digital assistant (PDA) or cellular telephone 400A, desktop computer 400B, laptop computer 400C, and/or automobile computer system 400N may communicate. Nodes 400 may communicate with one another. They may be grouped (not shown) physically or virtually, in one or more networks, such as Private, Community, Public, or Hybrid clouds as described hereinabove, or a combination thereof. This allows cloud computing environment 410 to offer infrastructure, platforms and/or software as services for which a cloud consumer does not need to maintain resources on a local computing device. It is understood that the types of computing devices 400A-N shown in FIG. 4 are intended to be illustrative only and that computing nodes 400 and cloud computing environment 410 can communicate with any type of computerized device over any type of network and/or network addressable connection (e.g., using a web browser).

Figure 5:
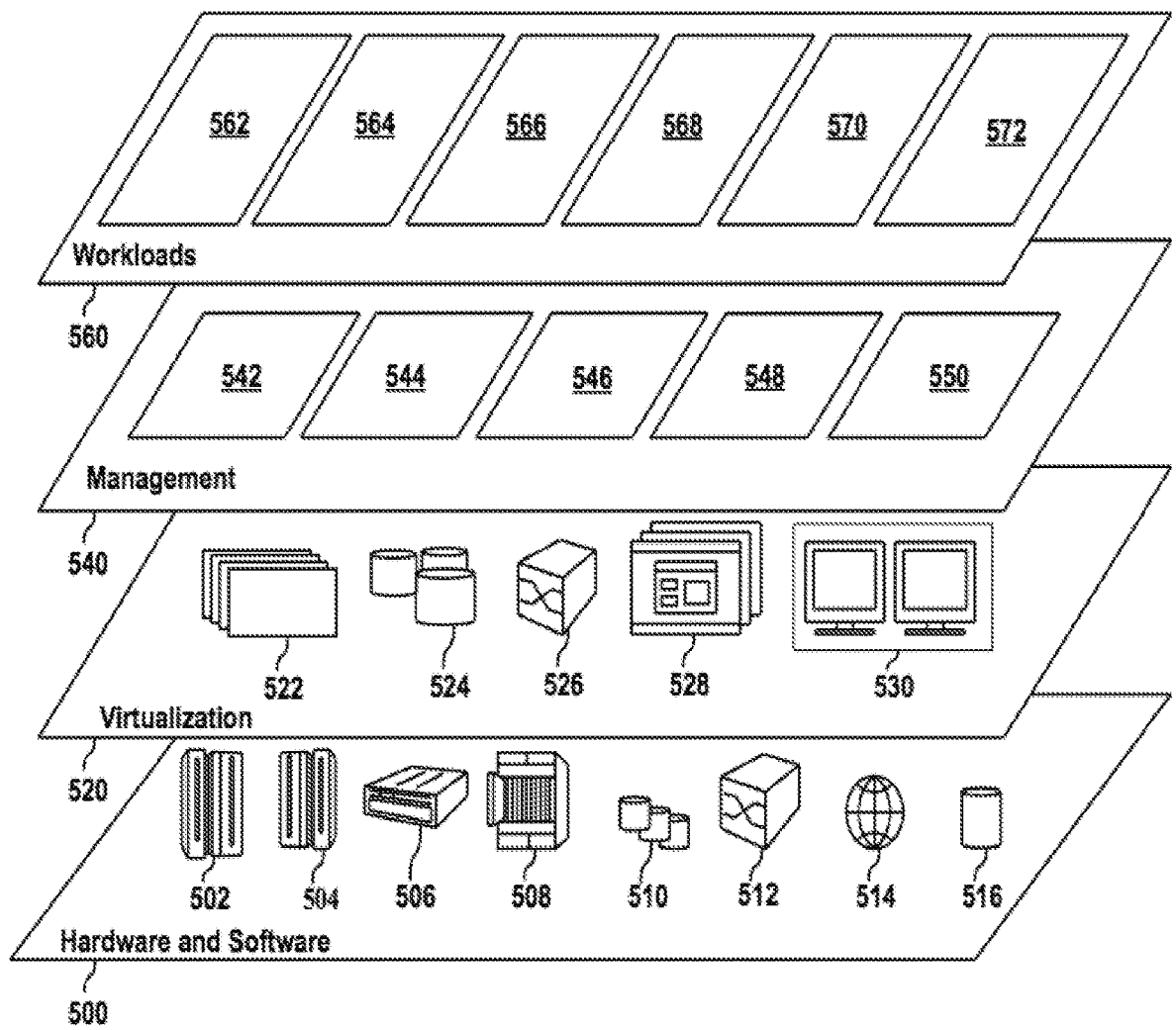
FIG. 5 depicts abstraction model layers according to an embodiment of the present invention.

Referring now to FIG. 5, a set of functional abstraction layers provided by cloud computing environment 410 (FIG. 4) is shown. It should be understood in advance that the components, layers, and functions shown in FIG. 5 are intended to be illustrative only and embodiments of the invention are not limited thereto. As depicted below, the following layers and corresponding functions are provided.

Hardware and software layer 500 includes hardware and software components. Examples of hardware components include: mainframes 502; RISC (Reduced Instruction Set Computer) architecture based servers 504; servers 506; blade servers 508; storage devices 510; and networks and networking components 512. In some embodiments, software components include network application server software 514 and database software 516.

Virtualization layer 520 provides an abstraction layer from which the following examples of virtual entities may be provided: virtual servers 522; virtual storage 524; virtual networks 526, including virtual private networks; virtual applications and operating systems 528; and virtual clients 530.

In one example, management layer 540 may provide the functions described below. Resource provisioning 542 provides dynamic procurement of computing resources and other resources that are utilized to perform tasks within the cloud computing environment. Metering and Pricing 544 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 546 provides access to the cloud computing environment for consumers and system administrators. Service level management 548 provides cloud computing resource allocation and management such that required service levels are met. Service Level Agreement (SLA) planning and fulfillment 550 provide pre-arrangement for, and procurement of, cloud computing resources for which a future requirement is anticipated in accordance with an SLA.

Workloads layer 560 provides examples of functionality for which the cloud computing environment may be utilized. Examples of workloads and functions which may be provided from this layer include: mapping and navigation 562; software development and lifecycle management 564; virtual classroom education delivery 566; data analytics processing 568; transaction processing 570; and transforming a first format of an electronic message to a second format 572.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

Although the present invention has been described in terms of specific embodiments, it is anticipated that alterations and modification thereof will become apparent to the skilled in the art. Therefore, it is intended that the following claims be interpreted as covering all such alterations and modifications as fall within the true spirit and scope of the invention.

What is claimed is:

1. A method of managing disaster recovery with a unified data layer, the method comprising:
    establishing a primary system at a first site, wherein the primary system includes both a primary instance of an application being hosted by the primary system and a primary database for data of the application, wherein the application is hosted for remote users that use the application to manage data of the primary database;
    establishing a unified data layer for the primary system at a second site; wherein the unified data layer provides access to data of the primary database without providing access to the primary database, wherein the second site is remote from the first site;
    detecting a triggering event of the primary system, wherein the triggering event impairs the ability of the primary system to host the application;
    instantiating a recovery system in response to detecting the triggering event, wherein the recovery system includes both a recovery instance of the application and a recovery database for the data of the application, wherein the recovery system is not located at the first site;
    populating the recovery database using the unified data layer; and
    activating the recovery system, wherein the activating the recovery system includes allowing the remote users to access the recovery instance of the application to manage data of the recovery database.

2. The method of claim 1, wherein the unified data layer includes both an image of the primary database at a first point in time and a log of updates to data of the primary database, wherein the log of updates includes updates that have occurred since the first point in time.

3. The method of claim 2, wherein the log of updates include updates to data of the recovery database in response to activating the recovery system.

4. The method of claim 1, further comprising:
    detecting availability of the primary system to host the application without impairment;
    updating the primary database using the unified data layer in response to detecting the availability of the primary system; and
    activating the primary system, wherein the activating the primary system includes allowing the remote users to access the primary instance of the application to manage data of the primary database.

5. The method of claim 4, further comprising deactivating the recovery system at a second point in time, wherein the second point in time occurs immediately before activating the primary system and is prior to a first point in time.

6. The method of claim 5, wherein the unified data layer includes both an image of the primary database at the first point in time and a log of updates to data of the primary database, wherein the log of updates include:
    updates that have occurred to data of the primary database since the first point in time; and
    updates to data of the recovery database in response to activating the recovery system until a third point in time.

7. The method of claim 4, further comprising re-initializing the unified data layer using the primary database, wherein the re-initializing the unified data layer includes transmitting, to the unified data layer, updates to data of the primary database that occurred before the triggering event and did not get transmitted to the unified data layer.

8. The method of claim 4, further comprising:
    gathering an image of the recovery database at a second point in time in response to the recovery database being populated, wherein the second point in time occurs before the recovery system is activated and is prior to a first point in time, wherein the image of the recovery database is part of the unified data layer;
    gathering updates to the recovery database in a log of updates, wherein the log of updates includes updates that have occurred since the second point in time, wherein the log of updates is part of the unified data layer; and
    using the log of updates to update the primary database in response to the detecting the availability of the primary system.

9. A system comprising:
    a memory; and
    a processor in communication with the memory, the processor being configured to perform operations comprising:
    establishing a primary computer system at a first site, wherein the primary computer system includes both a primary instance of an application being hosted by the primary computer system and a primary database for data of the application, wherein the application is hosted for remote users that use the application to manage data of the primary database;
    establishing a unified data layer for the primary computer system at a second site; wherein the unified data layer provides access to data of the primary database without providing access to the primary database, wherein the second site is remote from the first site;
    detecting a triggering event of the primary computer system, wherein the triggering event impairs the ability of the primary computer system to host the application;
    instantiating a recovery system in response to detecting the triggering event, wherein the recovery system includes both a recovery instance of the application and a recovery database for the data of the application, wherein the recovery system is not located at the first site;

populating the recovery database using the unified data layer; and activating the recovery system, wherein activating the recovery system includes allowing the remote users to access the recovery instance of the application to manage data of the recovery database.

10. The system of claim 9, wherein the unified data layer includes both an image of the primary database at a first point in time and a log of updates to data of the primary database, wherein the log of updates includes updates that have occurred since the first point in time.

11. The system of claim 10, wherein the log of updates include updates to data of the recovery database in response to the activating the recovery system.

12. The system of claim 9, further comprising:

detecting availability of the primary computer system to host the application without impairment;

updating the primary database using the unified data layer in response to the detecting the availability of the primary computer system; and activating the primary computer system, wherein activating the primary computer system includes allowing the remote users to access the primary instance of the application to manage data of the primary database.

13. The system of claim 12, further comprising deactivating the recovery system at a second point in time, wherein the second point in time occurs immediately before activating the primary computer system and is prior to a first point in time.

14. The system of claim 13, wherein the unified data layer includes both an image of the primary database at the first point in time and a log of updates to data of the primary database, wherein the log of updates include:

updates that have occurred to data of the primary database since the first point in time; and updates to data of the recovery database in response to activating the recovery system until a third point in time.

15. The system of claim 12, further comprising re-initializing the unified data layer using the primary database, wherein the re-initializing the unified data layer includes transmitting, to the unified data layer, updates to data of the primary database that occurred before the triggering event and did not get transmitted to the unified data layer.

16. The system of claim 12, further comprising:

gathering an image of the recovery database at a second point in time in response to the recovery database being populated, wherein the second point in time occurs before the recovery system is activated and is prior to a first point in time, wherein the image of the recovery database is part of the unified data layer;

gathering updates to the recovery database in a log of updates, wherein the log of updates includes updates that have occurred since the second point in time, wherein the log of updates is part of the unified data layer; and using the log of updates to update the primary database in response to detecting the availability of the primary computer system.

17. A computer program product comprising a computer readable storage medium having program instructions embodied therewith, the program instructions executable by a processor to cause the processor to perform a method, the method comprising:

establishing a primary system at a first site, wherein the primary system includes both a primary instance of an application being hosted by the primary system and a primary database for data of the application, wherein the application is hosted for remote users that use the application to manage data of the primary database;

establishing a unified data layer for the primary system at a second site; wherein the unified data layer provides access to data of the primary database without providing access to the primary database, wherein the second site is remote from the first site;

detecting a triggering event of the primary system, wherein the triggering event impairs the ability of the primary system to host the application;

instantiating a recovery system in response to detecting the triggering event, wherein the recovery system includes both a recovery instance of the application and a recovery database for the data of the application, wherein the recovery system is not located at the first site;

populating the recovery database using the unified data layer; and activating the recovery system, wherein the activating the recovery system includes allowing the remote users to access the recovery instance of the application to manage data of the recovery database.

18. The computer program product of claim 17, wherein the unified data layer includes both an image of the primary database at a first point in time and a log of updates to data of the primary database, wherein the log of updates includes updates that have occurred since the first point in time.

19. The computer program product of claim 18, wherein the log of updates include updates to data of the recovery database in response to the activating the recovery system.

20. The computer program product of claim 17, further comprising:

detecting availability of the primary system to host the application without impairment;

updating the primary database using the unified data layer in response to detecting the availability of the primary system; and activating the primary system, wherein activating the primary system includes allowing the remote users to access the primary instance of the application to manage data of the primary database.

* * * * *